US009903968B2

(12) United States Patent
Stork

(10) Patent No.: US 9,903,968 B2
(45) Date of Patent: Feb. 27, 2018

(54) NOISE REMOVAL IN NON-UNIFORMLY SPACED SEISMIC RECEIVER ARRAYS

(71) Applicant: ION GEOPHYSICAL CORPORATION, Houston, TX (US)

(72) Inventor: Christof Stork, Denver, CO (US)

(73) Assignee: ION Geophysical Corporation, Houston, TX (US)

( * ) Notice: Subject to any disclaimer, the term of this patent is extended or adjusted under 35 U.S.C. 154(b) by 22 days.

(21) Appl. No.: 14/887,948

(22) Filed: Oct. 20, 2015

(65) Prior Publication Data

US 2016/0109595 A1    Apr. 21, 2016

Related U.S. Application Data

(60) Provisional application No. 62/065,990, filed on Oct. 20, 2014.

(51) Int. Cl.
| | | |
|---|---|---|
| G01V 1/20 | (2006.01) | |
| G01V 1/32 | (2006.01) | |
| G01V 1/36 | (2006.01) | |
| G01V 1/00 | (2006.01) | |
| G01V 1/28 | (2006.01) | |

(52) U.S. Cl.
CPC .............. *G01V 1/36* (2013.01); *G01V 1/003* (2013.01); *G01V 1/28* (2013.01); *G01V 1/32* (2013.01); *G01V 2210/20* (2013.01); *G01V 2210/324* (2013.01); *G01V 2210/3248* (2013.01); *G01V 2210/55* (2013.01)

(58) Field of Classification Search
CPC . G01V 1/20; G01V 1/003; G01V 1/36; G01V 2210/32; G01V 2210/3248
USPC .......................................................... 367/58
See application file for complete search history.

(56) References Cited

U.S. PATENT DOCUMENTS

| | | | | |
|---|---|---|---|---|
| 2,331,080 A | * | 10/1943 | Petty ......................... | G01V 1/20 367/48 |
| 2,678,107 A | * | 5/1954 | Woods ...................... | G01V 1/20 367/58 |
| 2,906,363 A | * | 9/1959 | Clay, Jr. ................... | G01V 1/20 343/844 |
| 4,001,770 A | | 1/1977 | Hofer | |

(Continued)

FOREIGN PATENT DOCUMENTS

WO    WO 0157955 A1  *  8/2001  .............. G01V 1/20

OTHER PUBLICATIONS

Communication Relating to the Results of the Partial International Search, from European Patent Office, for International Application No. PCT/US2015/056421, dated Jan. 28, 2016, Annex to Form PCT/ISA/206.

*Primary Examiner* — Ian J Lobo
(74) *Attorney, Agent, or Firm* — Holland & Hart LLP

(57) ABSTRACT

Embodiments of non-uniformly spaced seismic receiver arrays and associated noise removal techniques are disclosed. In one embodiment of a method of seismic data acquisition, a plurality of seismic receivers may be positioned in an array having a plurality of regions, each region in the array having a respective average spacing between seismic receivers, with the average spacing in a second region of the plurality of regions being greater than the average spacing in a first region of the plurality of regions that is adjacent to the second region. Seismic data may be acquired utilizing the plurality of seismic receivers, and noise may be removed therefrom.

31 Claims, 11 Drawing Sheets

(56) References Cited

U.S. PATENT DOCUMENTS

| | | | | |
|---|---|---|---|---|
| 4,499,565 A | * | 2/1985 | Fix | G01V 1/20 |
| | | | | 367/49 |
| 5,105,391 A | * | 4/1992 | Rice | G01V 1/42 |
| | | | | 181/112 |
| 6,847,896 B1 | * | 1/2005 | Orban | G01V 1/003 |
| | | | | 367/118 |
| 7,830,748 B2 | * | 11/2010 | Guigne | G01V 1/28 |
| | | | | 181/108 |
| 2008/0215246 A1 | * | 9/2008 | Stork | G01V 1/003 |
| | | | | 702/14 |
| 2010/0054083 A1 | | 3/2010 | Stork | |
| 2011/0158048 A1 | * | 6/2011 | Guigne | G01V 1/20 |
| | | | | 367/56 |

\* cited by examiner

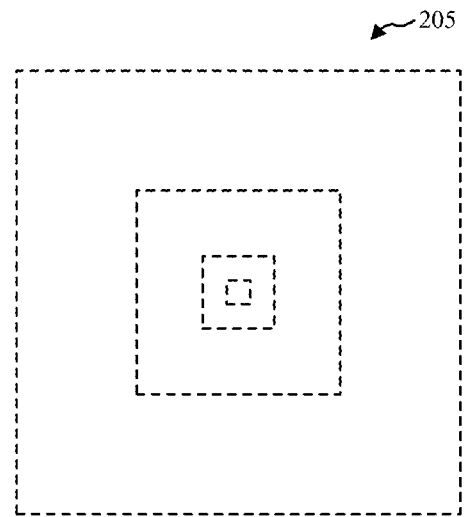
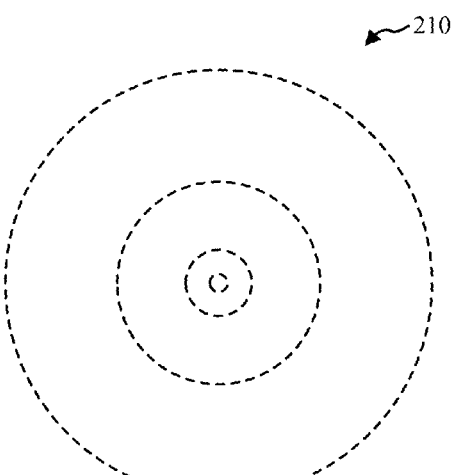
FIG. 2A  FIG. 2B
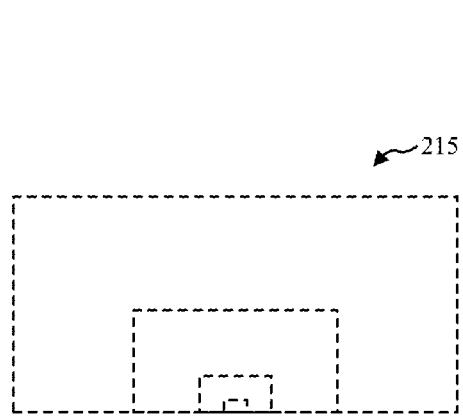
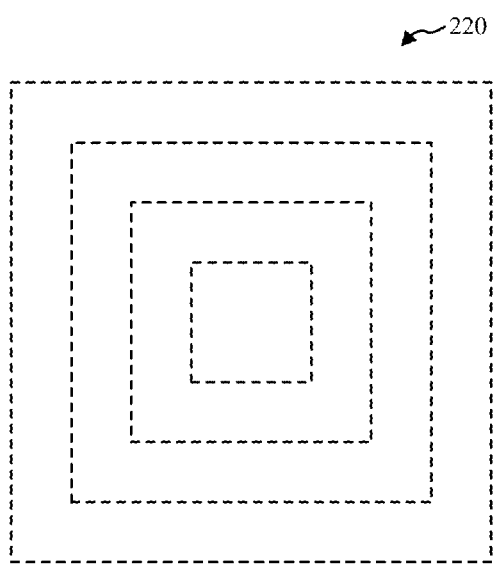
FIG. 2C  FIG. 2D

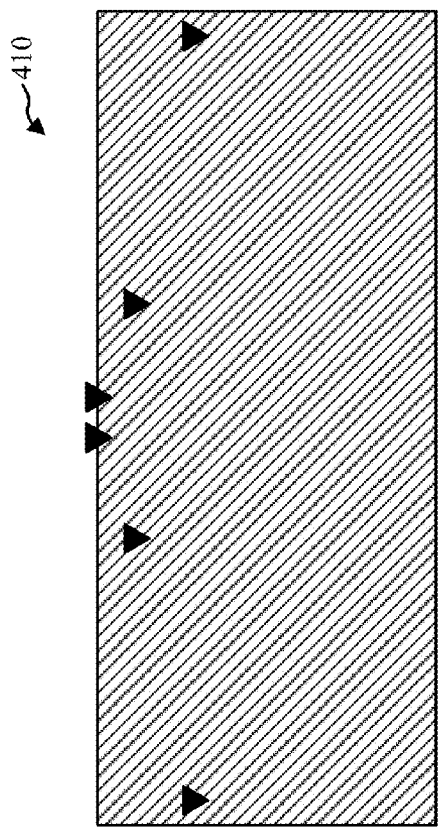
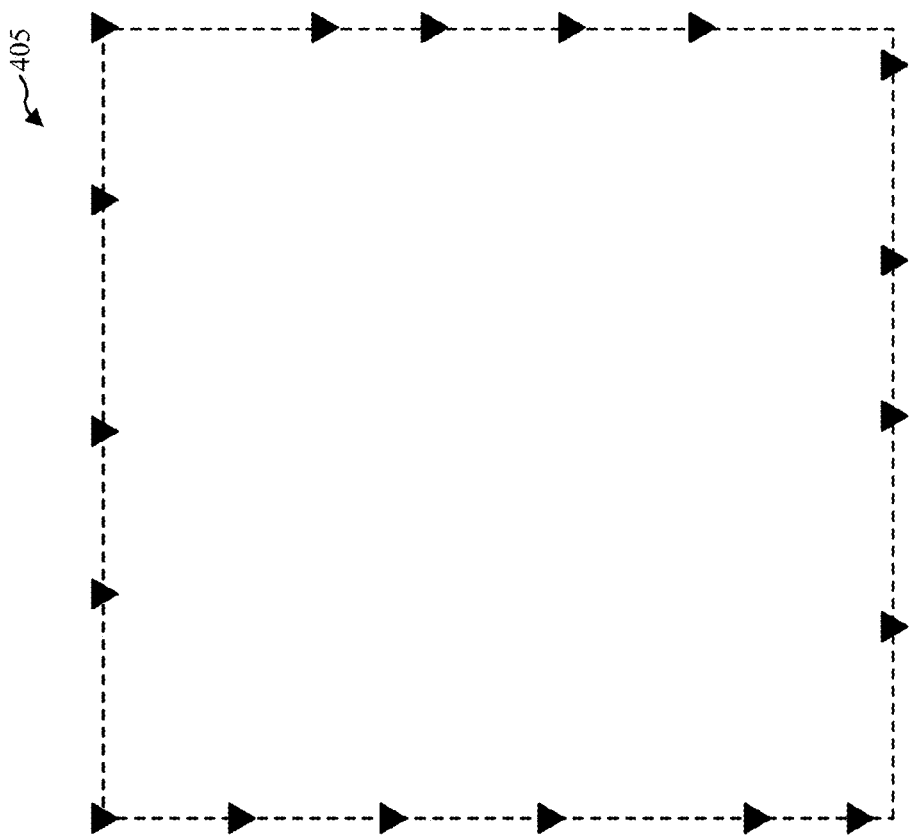
FIG. 4B
FIG. 4A

NOISE REMOVAL IN NON-UNIFORMLY SPACED SEISMIC RECEIVER ARRAYS

CROSS REFERENCES

This application claims priority to and the benefit of U.S. Provisional Patent Application No. 62/065,990, titled "Noise Removal in Non-Uniformly Spaced Seismic Receiver Arrays," filed Oct. 20, 2014, which is hereby incorporated by reference in its entirety for all purposes.

TECHNICAL FIELD

The present disclosure generally relates to seismic data acquisition and processing, and more particularly to noise removal in non-uniformly spaced seismic receiver arrays.

BACKGROUND

In many areas of the earth, the shallow part of the ground (e.g., the upper 200 meters) has a very low seismic velocity. When a seismic energy source is activated at or near the surface, a significant amount of energy may stay in this shallow layer, which may effectively act as a wave guide. The energy in this shallow layer can be relatively high in amplitude compared to energy reflected from deeper layers of the earth, and hence acts as noise that may impede an effective seismic investigation of the deeper layers.

BRIEF DESCRIPTION OF THE DRAWINGS

FIGS. 2A-2D are diagrams illustrating examples of acquisition geometries that may be used in the seismic data acquisition system from FIG. 1 in accordance with aspects of the present disclosure.

FIGS. 4A-4B are diagrams illustrating examples of acquisition geometries that may be used in the seismic data acquisition system from FIG. 1 in accordance with aspects of the present disclosure.

DETAILED DESCRIPTION

Described herein are acquisition geometries and data processing techniques that may be used in a seismic data acquisition system to isolate and remove at least a portion of noise from seismic data—for example, the noise associated with scattering and reflections of a surface seismic source in the shallow layers of the earth (e.g., down to 200 meters). The noise from the shallow layers may have relatively low surface phase velocity as compared to the faster (often significantly faster) surface phase velocity of signals from the deeper geological layers. Surface phase velocity, as that term is used herein, may refer to the speed at which energy is observed traveling on the surface of the earth, and may be determined by dividing the actual velocity of a seismic wave by the cosine of its incident angle at the earth's surface. In some embodiments described below, this difference in surface phase velocities may be exploited to help separate noise from desired seismic energy signals.

The present disclosure provides examples of acquisition geometries that allow for the recording of surface phase velocity information associated with near-surface noise in a cost-efficient manner. Because the shallow layer noise is often backscattered and arrives at the seismic receivers from many different directions, seismic receiver spacing is conventionally very small in order to measure the surface phase velocity information. Described herein, however, are acquisition geometries that may allow the surface phase velocity information to be recorded with fewer seismic receivers than conventionally needed to do the same. The geometries may be, for example, concentric two-dimensional rings, with the distance between successive rings and the average spacing between seismic receivers associated with each successive ring both growing progressively larger from the inner ring to the outer rings. In other embodiments, geometries may not include concentric two-dimensional rings, but may instead include a two-dimensional array with at least one portion of the array having denser spacing than other portions of the array. Certain embodiments of the present disclosure may further provide for combining the non-uniformly spaced two-dimensional arrays with new processing methods in order to better resolve the surface phase velocity of the energy recorded in the acquired seismic data, which may subsequently be used to separate the desired signal from the noise.

Figure 1A:
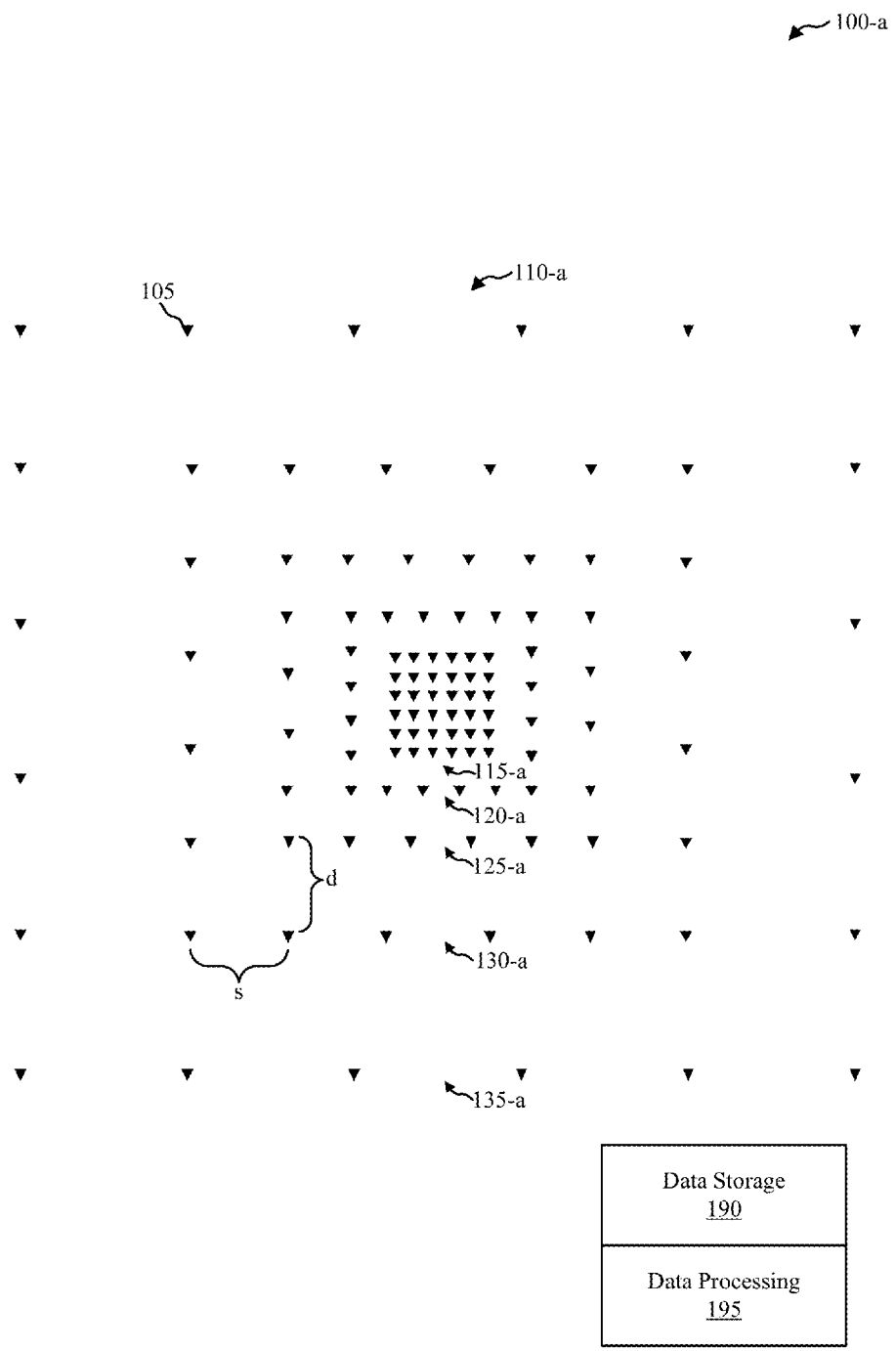
FIGS. 1A-1C are diagrams illustrating examples of seismic data acquisition systems in accordance with aspects of the present disclosure.

Turning now to the figures, FIG. 1A is a diagram illustrating one example of a seismic data acquisition system 100-a in accordance with aspects of the present disclosure. The system 100-a illustrated in FIG. 1A includes a plurality of seismic receivers 105 positioned in an acquisition geometry 110-a that may allow surface phase velocity information to be recorded and subsequently used to remove shallow layer noise from the acquired seismic data. Each seismic receiver 105 may include, for example, a geophone, an accelerometer, or another motion sensor, and may measure motion in 1, 2, or 3 dimensions (e.g., x, y, and z). Each seismic receiver 105 may additionally or alternatively include a pressure sensor (e.g., in marine implementations). Each seismic receiver 105 may generate one or more traces corresponding to the one or more motion or pressure measurements, and may store the trace(s) locally and/or transmit the traces elsewhere for storage.

As illustrated in FIG. 1A, some embodiments of the system 100-a include data storage 190, which may be coupled to the plurality of seismic receivers 105 and may store seismic data acquired by the seismic receivers 105 for later processing by data processing 195, as described more fully below. Although not shown in FIG. 1A, the seismic data acquisition system 100-a may further include various control systems, including for example wired or wireless communication between the seismic receivers 105 and the data storage 190 and data processing 195, seismic sources (active or passive), and so forth. Further, while the system 100-a shown in FIG. 1A is described herein with reference to land-based seismic systems, it will be appreciated that similar techniques may be used in other seismic systems, including for example ocean bottom cable seismic data acquisition systems, ocean bottom node seismic data acquisition systems, and so forth. These and all other implementations of the techniques described herein are within the scope of the present disclosure and appended claims.

The acquisition geometry 110-a in FIG. 1A includes a plurality of regions 115-a, 120-a, 125-a, 130-a, 135-a together forming an array with non-uniformly spaced seismic receivers 105. While FIG. 1A illustrates 5 regions 115-a, 120-a, 125-a, 130-a, 135-a, other contemplated embodiments may include fewer regions (e.g., 2, 3, or 4) or more regions (e.g., 6, 7, 8, 9, 10, or even more than 10). Similarly, while other figures of the present disclosure show certain numbers of regions, it will be appreciated that these are merely given as examples, and that the acquisition geometry for specific seismic surveys may vary greatly.

In some embodiments, and as shown in FIG. 1A, the seismic receivers 105 may be positioned in a manner to enable them to record surface phase velocity information associated with near-surface noise. This may be accomplished by positioning the seismic receivers 105 in an array having a plurality of regions 115-a, 120-a, 125-a, 130-a, 135-a, each region in the array having a respective average spacing between seismic receivers 105, with the average spacing in a second region 120-a being greater than the average spacing in a first region 115-a that is adjacent to the second region, further with the average spacing in a third region 125-a being greater than the average spacing in the second region 120-a. In these embodiments, the average spacing between seismic receivers 105 may increase from the first region 115-a to the other regions 120-a, 125-a, 130-a, 135-a, with the average spacing between seismic receivers 105 in each region being progressively greater than the average spacing between seismic receivers 105 in the next-inner region. In other words, the innermost region 115-a may have the lowest average spacing between seismic receivers 105 (i.e., a higher density of seismic receivers 105), with successive regions 120-a, 125-a, 130-a, 135-a having progressively greater average spacings between seismic receivers 105 (i.e., lower density of seismic receivers 105). It will be appreciated that while these embodiments may be cost-effective (because larger regions have progressively fewer receivers), in alternative embodiments, the average spacing between receivers may not monotonically increase. For example, the innermost region 115-a may have the smallest average spacing between seismic receivers 105, but the third region 125-a may have a smaller average spacing between seismic receivers 105 than the second region 120-a, even though the second region 120-a is further towards the middle of the array than the third region 125-a.

The average spacing of the seismic receivers 105 within a given region 115-a, 120-a, 125-a, 130-a, 135-a of the array may be with reference to one-dimensional spacing (e.g., in either the x or y direction), with reference to two-dimensional spacing (e.g., in both the x and y direction), with reference to an angular spacing (e.g., in a polar coordinate system), and so forth. In still other examples, the average spacing of the seismic receivers 105 may be with reference to an average density of seismic receivers 105 (e.g., receivers per surface area of the earth). Also, in some embodiments, the average spacing between seismic receivers 105 may not be uniformly referenced between different regions 115-a, 120-a, 125-a, 130-a, 135-a—for example, the average spacing may be with reference to density in the inner most region 115-a, and may be with reference to angular or two-dimensional spacing for the other regions, 120-a, 125-a, 130-a, 135-a. Generally any method of measuring and accounting for spacing between seismic receivers 105 may be used in various aspects of the present disclosure.

In some embodiments, and as shown in FIG. 1A, the regions 115-a, 120-a, 125-a, 130-a, 135-a may be defined by a plurality of rings, with the first region 115-a being an innermost region associated with a first ring, the second, third, and fourth regions 120-a, 125-a, 130-a being middle regions associated with second, third, and fourth rings, and the fifth region 135-a being an outermost region associated with an outermost ring. In this manner, each successive region may circumscribe the next-inner region (geographically speaking), so that the second region 120-a surrounds and circumscribes the first region 115-a, the third region 125-a surrounds and circumscribes the second region 120-a, and so forth. The rings defining the regions 115-a, 120-a, 125-a, 130-a, 135-a may further be concentric in some embodiments, such that each of the regions 115-a, 120-a, 125-a, 130-a, 135-a share a common midpoint, which may be part of the first region 115-a. In other embodiments, however, the regions need not be defined in this manner—for example, they may not share a common midpoint, they may not be symmetrical, they may not be concentric, and so forth.

In one specific embodiment, and again as shown in FIG. 1A, the average spacing (denoted s in FIG. 1A) between seismic receivers in one region 130-a may be substantially similar to an average distance (denoted d in FIG. 1A) between that region 130-a and the next-inner region 125-a. The spacing s may be substantially similar to the distance d if the two measurements are within 0.1%, 1%, 5%, 10%, 20%, or 25% of one another, or if the two measurements are the same.

Additionally, the actual spacing between seismic receivers 105 within a region may allow for some randomness of the positions of the seismic receivers 105, as long as the average spacing s is maintained. The actual spacing between seismic receivers 105 in a region may vary by as much as 30% while still preserving the average spacing s.

It will be appreciated that the example acquisition geometry 110-a shown in FIG. 1A may reduce the number of seismic receivers needed to acquire a seismic survey (e.g., 116 in FIG. 1A) as compared with a traditional acquisition geometry that may require a substantially larger number of seismic receivers (e.g., 1600 in FIG. 1A) to avoid aliasing effects in the recorded noise.

Figure 1B:
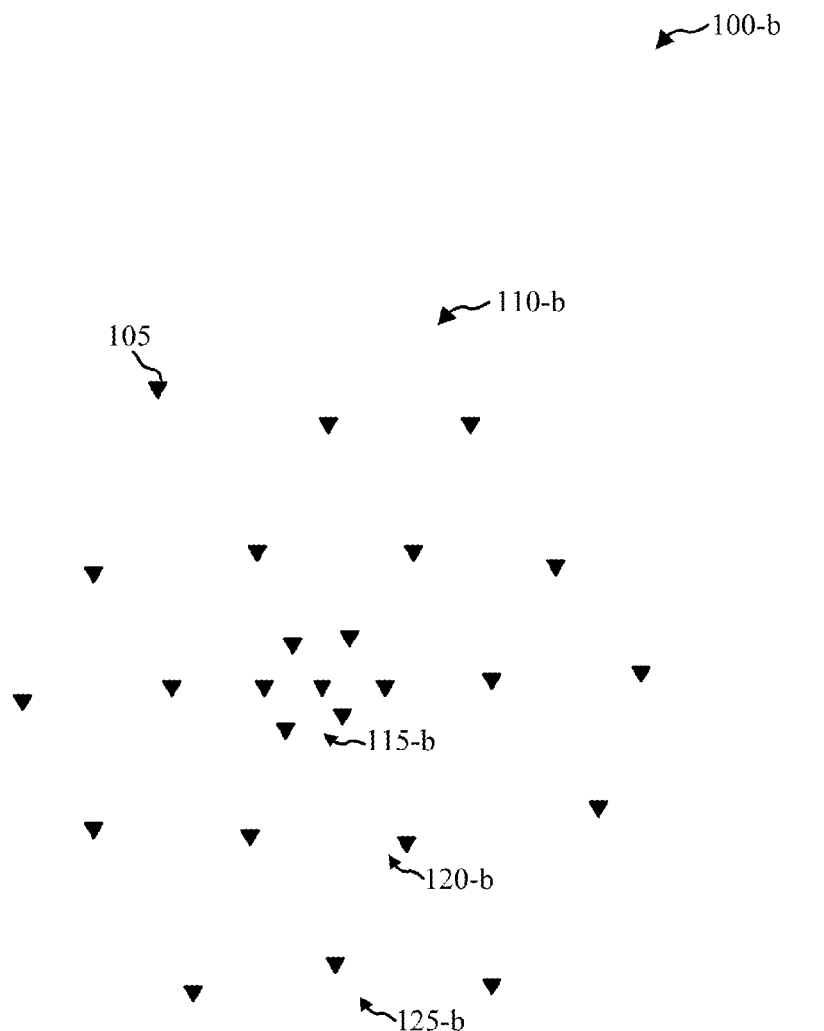
Figure 1C:
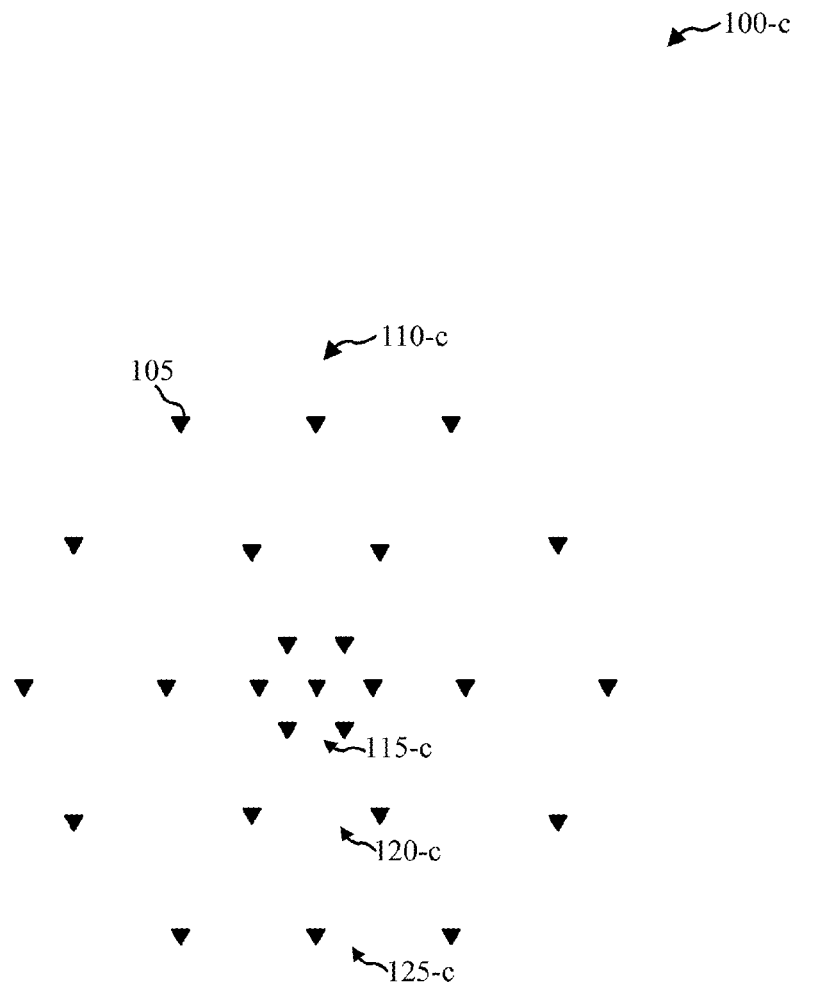

FIGS. 1B and 1C illustrate additional examples of seismic data acquisition systems in accordance with aspects of the present disclosure. Whereas the acquisition geometry 110-a of FIG. 1A was generally in the shape of a square ring array, FIGS. 1B and 1C illustrate hexagonal ring array receiver patterns. For example, FIG. 1B illustrates a seismic data acquisition system 100-b that includes a plurality of seismic receivers 105 positioned in an acquisition geometry 110-b. Acquisition geometry 110-b is a hexagonal ring array receiver pattern that includes some randomness in the location of the seismic receivers 105. The acquisition geometry 110-b includes a number of regions, including regions 115-b, 120-b, and 125-b. The spacing and/or density of the seismic receivers 105 in at least one of the regions 115-b, 120-b, 125-b may differ from the spacing and/or density of seismic receivers 105 in the other regions 115-b, 120-b, 125-b. In another example, FIG. 1C illustrates a seismic data acquisition system 100-*c* that includes a plurality of seismic receivers 105 positioned in an acquisition geometry 110-*c*. Acquisition geometry 110-*c* is a hexagonal ring array receiver pattern that does not include randomness in the location of the seismic receivers 105. The acquisition geometry 110-*c* includes a number of regions, including regions 115-*c*, 120-*c*, and 125-*c*. The spacing and/or density of the seismic receivers 105 in at least one of the regions 115-*c*, 120-*c*, 125-*c* may differ from the spacing and/or density of seismic receivers 105 in the other regions 115-*c*, 120-*c*, 125-*c*.

The seismic data acquisition systems 100-*a*, 100-*b*, and 100-*c* demonstrate that different geographies and degrees of randomness may be used. The variations may include different patterns (e.g., hexagonal and square ring patterns). The variations may include different degrees of randomness in the locations of the seismic receivers 105. Further, the variations may include different numbers and densities of seismic receivers 105. Additional variations are described below with respect to FIGS. 2A-2D.

FIGS. 2A-2D are diagrams illustrating additional examples of acquisition geometries that may be used in the seismic data acquisition systems 100 of FIGS. 1A-1C in accordance with aspects of the present disclosure. FIGS. 2A-2D are similar to FIGS. 1A-1C, except that instead of showing individual seismic receivers 105, FIGS. 2A-2D merely show rings that may define the different regions of an array for seismic data acquisition. Nonetheless, as previously mentioned, the present disclosure is not limited to embodiments with concentric rings, but includes other arrays as described above.

Referring first to FIG. 2A, a diagram 205 is shown illustrating four concentric square-shaped rings which define four respective regions. The arrangement of rings in FIG. 2A is, in some aspects, similar to the arrangement in FIG. 1A. As shown in FIG. 2A, in some embodiments, distances between neighboring rings may get progressively larger from an innermost ring to an outermost ring. More specifically, as shown in FIG. 2A, in some embodiments, a first distance between a second concentric ring defining a second region and a third concentric ring defining a third region may be greater than a second distance between the second concentric ring and a first concentric ring defining the first region.

Referring now to FIG. 2B, the concentric rings defining the different regions of the array may take forms other than squares. For example, FIG. 2B shows a diagram 210 of concentric rings that define a circular shape. In still other embodiments, other shapes of rings are also contemplated, such as an ellipse, an octagon, a hexagon, a rectangle, a triangle, and so forth. Also, the concentric rings defining the different regions of the array may only be partial rings or unbalanced arrays, as shown in the diagram 215 of FIG. 2C. In still other embodiments, the concentric rings may not be symmetrical. As another example, in some embodiments, the distances between neighboring rings may not progressively increase from one ring to another—as shown for example in FIG. 2D, the distances between neighboring rings defining the different regions may be substantially constant among the different rings defining the different regions.

Referring now to FIGS. 2A-2D, in some embodiments, the average spacing between seismic sources in a first region (e.g., the inner or middlemost region) may be at least three times less than the average spacing in a neighboring or adjacent second region (e.g., the next-inner region). In other embodiments, the ratio of spacing between neighboring or adjacent regions may be smaller or larger, such as 1.5×, 2×, 4×, 6×, 8×, and so forth. Also, in some embodiments, the average spacing between seismic receivers may be smallest in the inner or middlemost region of all of the regions in an array, with the average spacing between seismic receivers getting progressively larger in regions progressively further away from the inner or middlemost region.

Figure 3B:
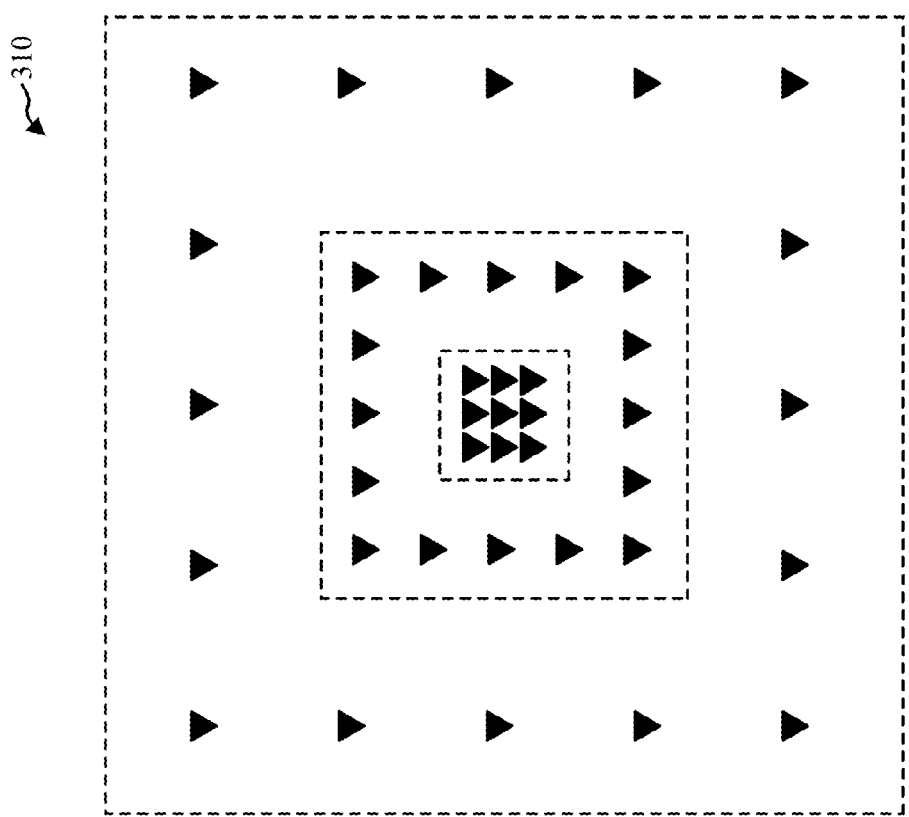
FIGS. 3A-3B are diagrams illustrating examples of acquisition geometries that may be used in the seismic data acquisition system from FIG. 1 in accordance with aspects of the present disclosure.
Figure 3A:
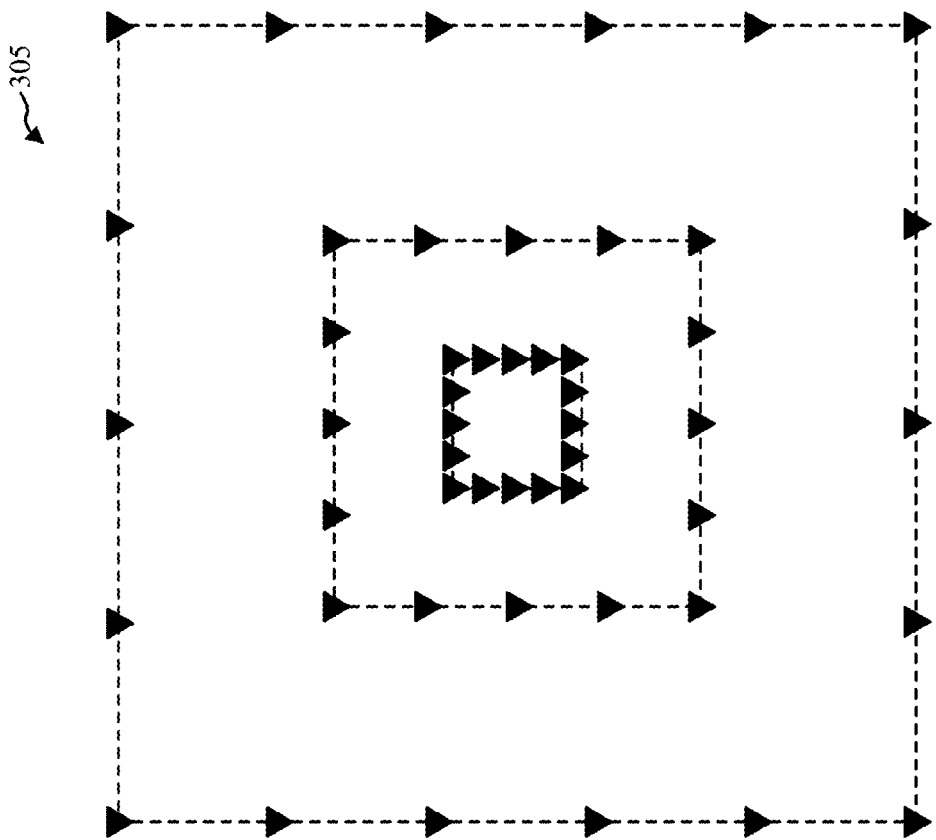

FIGS. 3A-3B are diagrams illustrating additional examples of acquisition geometries that may be used in the seismic data acquisition systems 100 of FIGS. 1A-1C. As illustrated in FIG. 3A, in some embodiments, the seismic receivers associated with each region may be positioned on boundaries (e.g., the concentric rings described above) that define the respective regions. As illustrated in FIG. 3B, however, in other embodiments, the seismic receivers associated with each region may be positioned in spaces between the boundaries defining the respective regions. Also, in some embodiments, the seismic receiver positioning shown in FIGS. 3A and 3B may be combined such that in some regions, the seismic receivers are positioned on boundaries for those regions, and positioned in spaces between boundaries for other regions.

FIGS. 4A-4B are diagrams illustrating still additional examples of acquisition geometries that may be used in the seismic data acquisition systems 100 of FIGS. 1A-1C. Referring first to the diagram 405 in FIG. 4A, one ring 405 defining a region of the array is shown, where the seismic receivers are randomly or pseudo-randomly spaced relative to one another within a specific region. The randomness factor associated with the randomly or pseudo-randomly spaced receivers may be 0.5 or less in some embodiments. Notwithstanding the diagram 405 in FIG. 4A, in other implementations of the present disclosure, some or all of the seismic receivers may be positioned in a non-random manner.

Referring now to FIG. 4B, a side-view diagram 410 is shown that illustrates the depths at which the seismic receivers may be buried. As illustrated in FIG. 4B, in some embodiments, seismic receivers may be positioned at varying depths at or near the earth surface (which may be underwater in marine implementations). The example illustrated in FIG. 4B shows seismic receivers in a first (middlemost) region positioned at the earth surface, and seismic receivers in a second region (adjacent to the first region) positioned below the earth surface. FIG. 4B further illustrates that for regions that are progressively further away from the middlemost region, the seismic receivers may be buried at progressively greater depths. In other embodiments, however, all of the seismic receivers may be positioned at the same depth, which may be at or near the surface.

Figure 5:
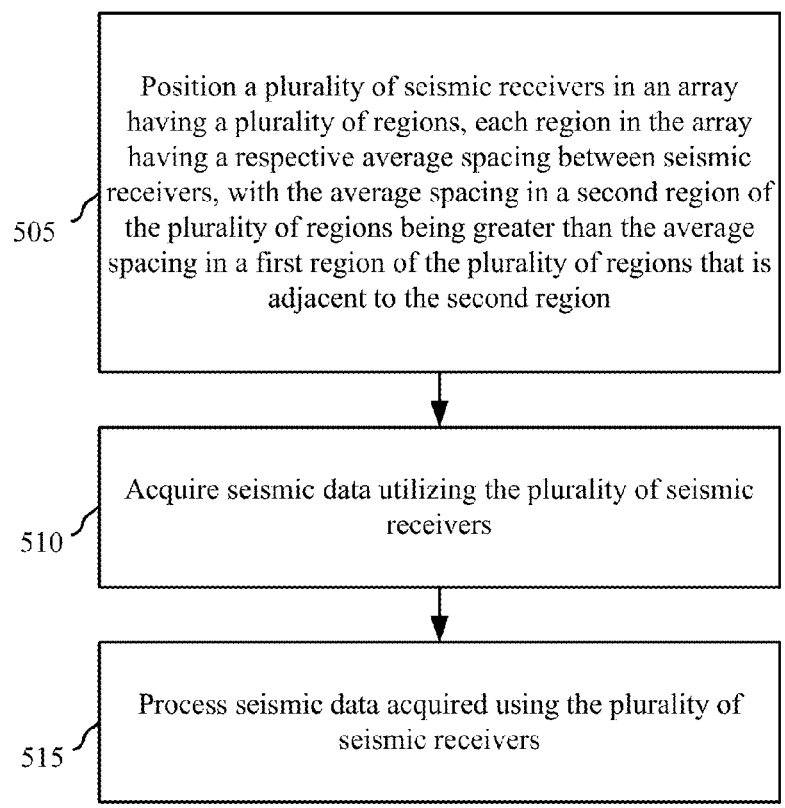
FIG. 5 is a flow chart illustrating an example of seismic data acquisition in accordance with aspects of the present disclosure.

FIG. 5 is a flow chart illustrating a method 500 of seismic data acquisition in accordance with aspects of the present disclosure. At block 505 of the method 500 shown in FIG. 5, a plurality of seismic receivers may be positioned in an array having a plurality of regions, as described above with reference to FIGS. 1A-4B. Each region in the array may have a respective average spacing between seismic receivers in that respective region, with the average spacing in a second (outer) region of the plurality of regions being greater than the average spacing in a first (inner) region of the plurality of regions that is adjacent to the second region.

At block 510 of the method 500 shown in FIG. 5, seismic data may be acquired utilizing the plurality of seismic receivers positioned at block 505. At block 515 of the method 500 shown in FIG. 5, the seismic data acquired using the plurality of receivers at block 510 may be processed in order to, for example, remove noise associated with shallow layers of the earth.

Method 500 may be varied by acquiring seismic data from multiple arrays that touch or overlap. Therefore, in method 500, a first array may be defined by a first plurality of seismic receivers positioned at block 505. A second array may be defined by a second plurality of seismic receivers. The second plurality of seismic receivers may be positioned in a manner similar to the first plurality of seismic receivers of the first array. At block 510, then, seismic data may be acquired utilizing the first plurality of seismic receivers of the first array and the second plurality of seismic receivers of the second array. At block 515, the acquired seismic data may be processed in order to, for example, remove noise associated with shallow layers of the earth.

Figure 6:
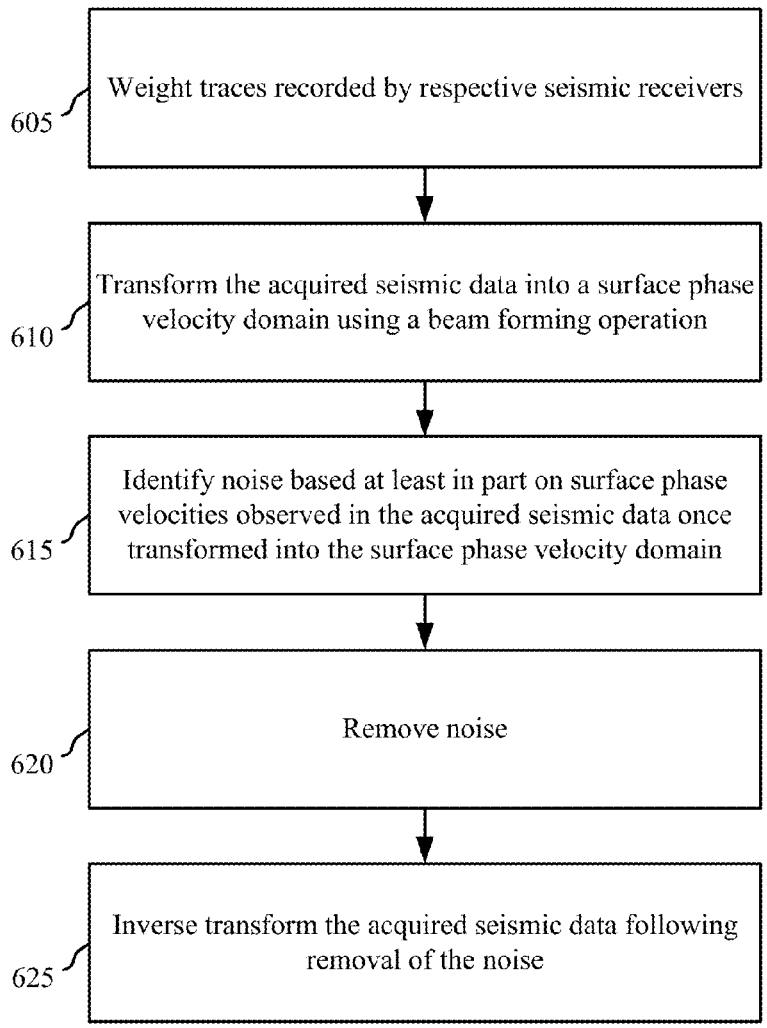
FIG. 6 is a flow chart illustrating an example of processing seismic data in accordance with aspects of the present disclosure.

FIG. 6 is a flow chart illustrating a method 600 of processing seismic data in accordance with aspects of the present disclosure. The method 600 may be performed by the data processing 195 in FIGS. 1A-1C, and may be an example of one or more aspects of block 515 in FIG. 5.

At block 605 of the method 600 shown in FIG. 6, traces recorded by respective seismic receivers may be weighted. The weighting in block 605 may be done prior to transforming the acquired seismic data, as discussed below with reference to block 610. In some embodiments, the trace for each respective seismic receiver may be weighted based at least in part on an average spacing between the respective seismic receiver and one or more (e.g., 1, 2, 3, 4, 5, 6, 7, 8, and so forth) neighboring receivers, with the weighting being a factor of the average spacing between the respective seismic receiver and the one or more neighboring seismic receivers raised to a power between 1 and 2 (e.g., 1.5 or 1.6 in some examples). In some embodiments, the traces corresponding to seismic receivers positioned in inner regions of an array (with a lower average spacing between seismic receivers) may be weighted less than traces corresponding to seismic receivers positioned in outer regions of the array (with a higher average spacing between seismic receivers), in order to normalize the weights given to different traces and help offset the non-uniformity of the seismic receiver spacing.

At block 610 of the method 600 shown in FIG. 6, the acquired seismic data (which may optionally have been weighted at block 605) may be transformed into a surface phase velocity domain using a beam forming operation. The beam forming operation may be one or more of a radon transform, a slant stack inversion, or a radon inversion transform. In some embodiments, common receiver gathers may be created for shots along a common azimuth (e.g., 45 degree azimuth range), using a seismic receiver near the center of the array.

In some embodiments, a sparsity constraint may be applied during the transformation of the acquired seismic data in block 610. The sparsity constraint may operate to encourage a sparse or spike angular decomposition result in the results of the beam forming operation. Such a sparsity constraint may be applied by, for example, iteratively applying a beam forming operation, with each subsequent iteration of the beam forming operation penalizing a surface phase velocity component by the inverse of the amplitude of that same surface phase velocity component from the previous iteration of the beam forming operation.

At block 615 of the method 600 shown in FIG. 6, noise (such as shallow layer or near surface noise) may be identified in the acquired seismic data based at least in part on surface phase velocities observed in the acquired seismic data once transformed into the surface phase velocity domain. In some embodiments, all energy that is slower than a predetermined threshold (e.g., 12,000 feet per second) may be considered noise.

At block 620 of the method 600 shown in FIG. 6, the noise identified at block 615 may be removed. For the example given above, block 620 may include filtering the seismic data to preserve energy faster than the predetermined threshold while discarding all of the rest.

At block 625 of the method 600 shown in FIG. 6, the acquired seismic data may be inversely transformed (e.g., back to the time-space domain or the time-frequency domain) following removal of the noise at block 620.

With reference still to the method 600 shown in FIG. 6, in some embodiments, time shift corrections may be computed and applied for at least some of the seismic receivers before, during, or after the beam forming operation of block 610 such that the time shift corrections vary smoothly in the surface phase velocity domain. The time shift corrections may be computed to enhance the sparse or spiky characteristics of the acquired seismic data in the surface phase velocity domain, and may help account for velocity anomalies near the respective seismic receivers (e.g., a formation near the seismic receiver that causes seismic waves to propagate anomalously fast or slow). In some embodiments, the corrections may vary smoothly by the energy incident angle. Also, in various embodiments, source statics corrections can be computed and applied, and various other, conventional noise attenuation techniques can be employed together with the methods described herein.

With reference still to the method 600 shown in FIG. 6, in some embodiments, positioning errors may be computed for at least some of the plurality of seismic receivers before, during, or after the beam forming operation of block 610. The positioning errors may be computed to enhance the sparse or spiky characteristics of the acquired seismic data in the surface phase velocity domain, and may help account for errors in the determined positions of the seismic receivers.

Figure 7:
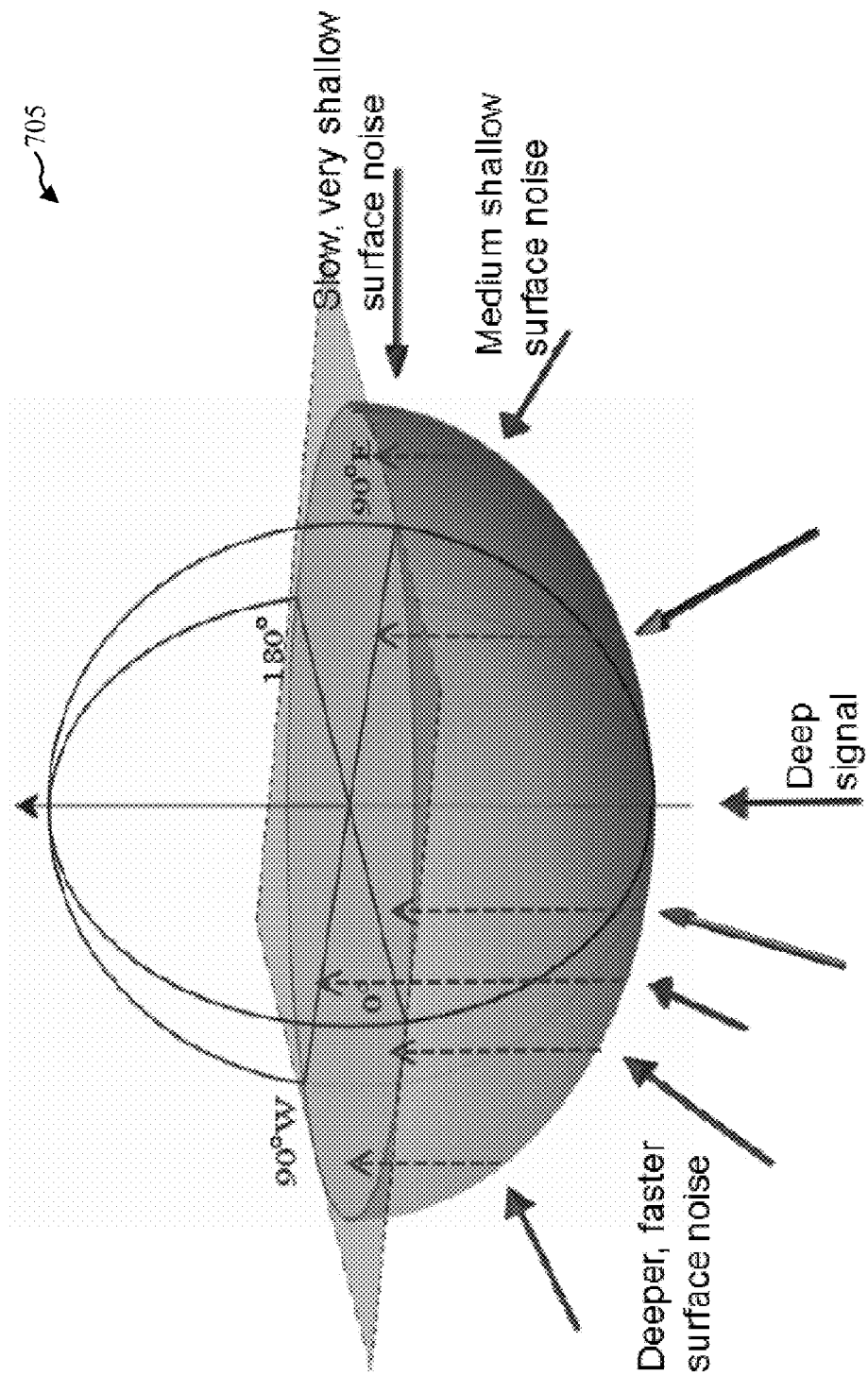
FIG. 7 is a diagram illustrating an example of a beam forming operation in accordance with aspects of the present disclosure.

FIG. 7 is a diagram 705 illustrating aspects relating to a beam forming operation, such as the beam forming operation described above with reference to block 610 of FIG. 6. In FIG. 7, a plurality of different seismic waves are shown arriving at various angles relative to the vertical. As noted in FIG. 7, the seismic waves arriving from a nearly horizontal angle have a relatively slow surface phase velocity and are associated with very shallow surface noise. Seismic waves arriving from a nearly vertical angle have a relatively fast surface phase velocity and are associated with seismic energy from deep geological layers. FIG. 7 also shows seismic waves arriving at intermediate angles with a medium surface phase velocity, which are associated with shallow surface noise.

With reference still to FIG. 7, the beam forming operation in block 610 of FIG. 6 may include adding time corrections to traces at various angles (so that the time corrections match the tilt of the beam forming angle). More specifically, in some embodiments, the beam forming operation may scan over a plurality of different angles, with the different angles specifying the time shifts to apply to the traces as the array is, in essence, tuned to the different possible arrival angles. The beam forming operation may scan over angles in all three dimensions (e.g., over all dips and azimuths), with the received energy constructively interfering when the beam forming scan angle matches the actual arrival angle. In this manner, the beam forming operation may be used to identify arrival angles (dip and azimuth) for various seismic events in the acquired seismic data. The arrival angles may be associated with the surface phase velocity of the associated seismic events, and can thus be used, as described above with reference to block 615, to remove slow, shallow surface noise from the acquired seismic data.

As also described above, several techniques may be employed in the beam forming operation to account for the non-uniform spacing of the seismic receivers within the array. For example, the recorded seismic traces may be weighted different in different regions. By normalizing the influence of traces based on the average spacing between the respective receiver and its neighboring receiver(s), the beam forming operation may more uniformly consider the data so that the traces in the inner or middlemost region aren't overly influential in the beam forming operation. Another technique that may be employed in the beam forming operation as described above is a sparsity normalization. A sparsity normalization may isolate or localize energy to help reduce the smearing of energy that may result from the beam forming operation. Motivated by the assumption that arriving energy is not smooth, but rather bursty or spiky, a sparsity normalization may mathematically encourage energy to focus on a few locations during the beam forming operation as opposed to smoothly and continuously varying over time.

Figure 8:
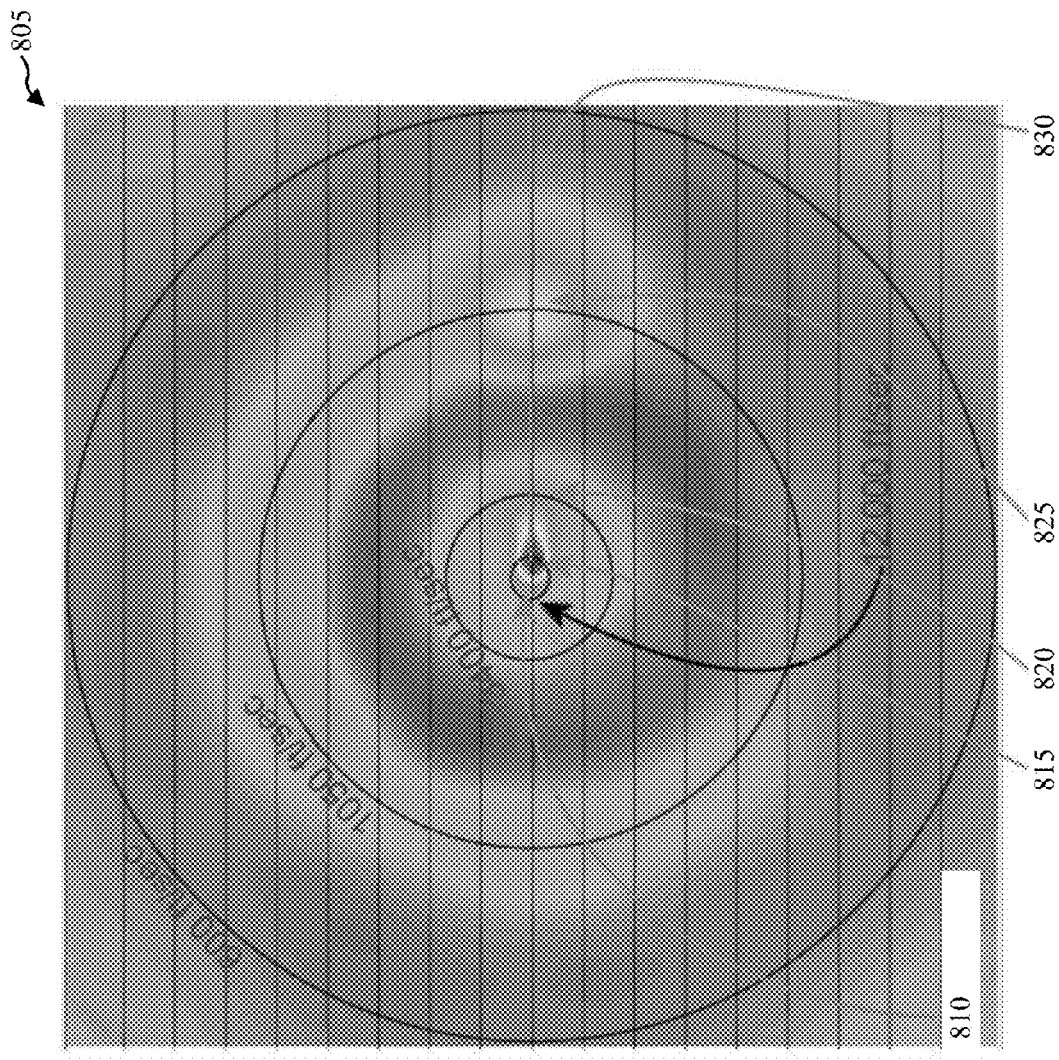
FIG. 8 is a diagram illustrating an example of seismic data that has been transformed into a surface phase velocity domain in accordance with aspects of the present disclosure.

Turning now to FIG. 8, a diagram 805 illustrating an example of seismic data that has been transformed into a surface phase velocity domain is shown. The diagram in FIG. 8 may be for one component of motion (e.g., the z or vertical component), and may be the result of applying a simple slant stack beam forming operation. Each point in the diagram 805 in FIG. 8 is associated with a specific angle. The angle may include a dip (with the highest dip values at the center of the diagram 805 and lower dip values at the outer portions of the diagram 805) and an azimuth (with the azimuth varying around the circumference of the diagram 805). As illustrated in FIG. 8, the different dip values may be associated with different arrival speeds (varying from 600 ft/sec to 3400 ft/sec in FIG. 8)—which may correspond to tuning the array to different arrival speeds (e.g., surface phase velocities) during the beam forming operation. The shading in the diagram 805 represents the amplitude of energy received at each given dip and azimuth.

With reference still to FIG. 8, reference numeral 810 (the inner or middlemost circle) may represent reflections, reference numeral 815 may refer to refracted energy, reference number 820 may refer to guided surface waves, reference numeral 825 may refer to air waves, and reference numeral 830 may refer to the line along which energy is directly received from the seismic source. In some embodiments, noise can be removed (e.g., in operation 620 of FIG. 6), by getting rid of all of the energy in FIG. 8 other than that in the smallest circle 810 (e.g., by setting values to zero), and then inverse transforming the data back out of the surface phase velocity domain.

By analyzing the noise as illustrated in FIG. 8, noise-signal ratios may be characterized for air noise (how deep to bury the seismic receivers), direct surface waves (and velocity), back scattered surface waves, ambient noise vs. source noise, guided waves, refractions Z component-horizontal component coupling. This may further provide what noise attenuation needs to be applied to normal data processing, which seismic source shots and/or which seismic traces are noisy and need editing, what changes are needed for future acquisition layouts, and so forth.

Referring now to FIGS. 1A-8, it will be appreciated that different entities may perform different aspects of the present disclosure. For example, one entity may position the seismic receivers and acquire the seismic data, while another entity performs the subsequent data processing. It will thus be understood that acquiring seismic data as described herein may be performed by a first entity with the intent of having a second, separate entity perform some or all of the disclosed processing operations. Similarly, the data processing techniques described herein can be performed by one entity to data acquired by another entity in accordance with the present disclosure (e.g., the data processing can be performed using seismic data that has been acquired using one or more of the acquisition geometries described above). In other examples, however, a single entity may perform both the acquisition and subsequent data processing.

Figure 9:
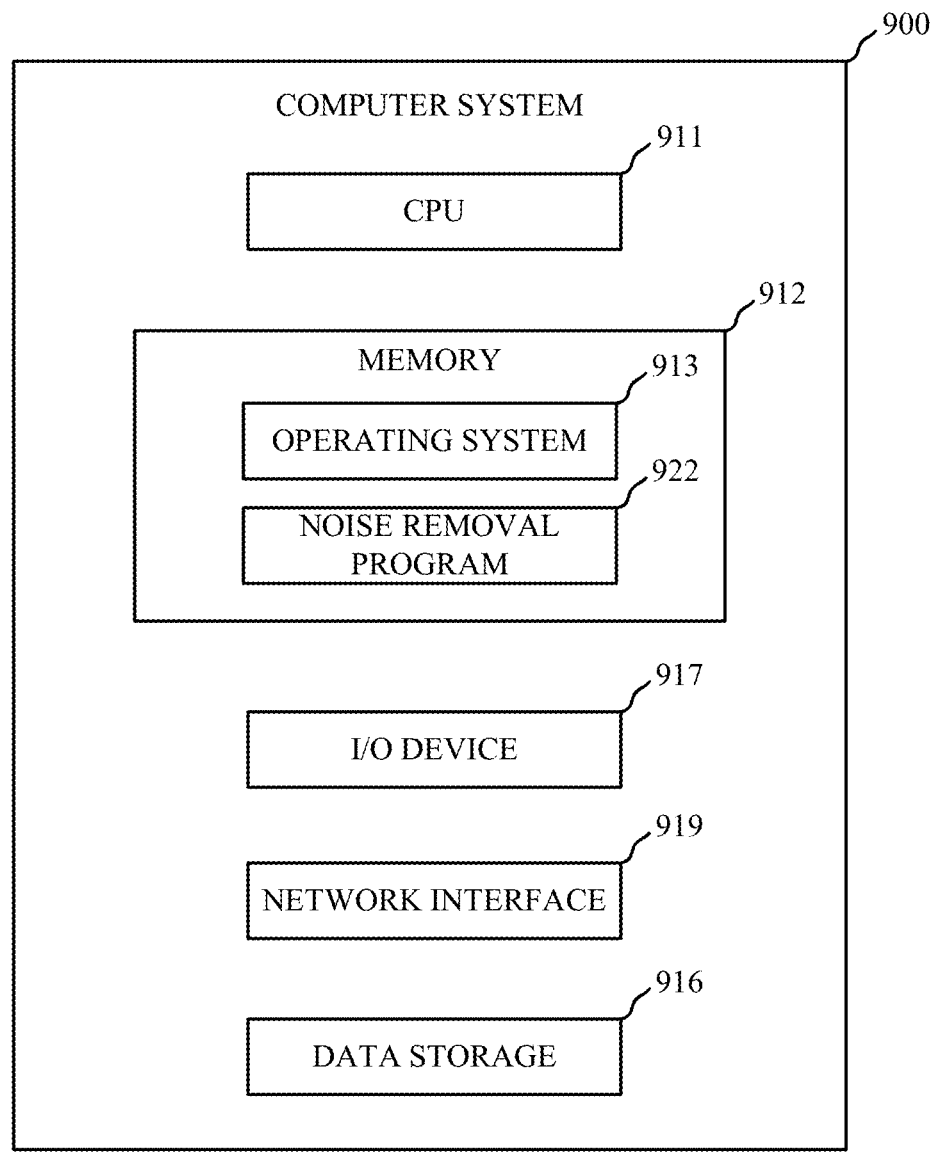
FIG. 9 is a diagram illustrating an example of a computer processing system that may be used in seismic data acquisition and processing in accordance with aspects of the present disclosure.

FIG. 9 illustrates an exemplary computer system 900, which may be used to perform one or more of the operations in the various methods described herein. As illustrated in FIG. 9, the computer system 900 may include at least one Central Processing Unit (CPU) 911, a memory 912, a data storage 916, an input/output device 917, and a network interface device 919. While a single CPU 911 is shown in FIG. 9, in alternative embodiments, a plurality of CPUs may be implemented within the computer system, or multiple computer systems may be combined as a processing cluster.

The input/output device 917 may include devices such as a mouse, keyboard, trackball, stylus pen, touchscreen, display (e.g., computer monitor), and the like. The network interface device 919 may be any entry/exit device configured to allow network communications between the computer system 900 and another device, e.g., another computer system, a server, and the like. In one embodiment, the network interface device 919 may be a network adapter or other network interface card (NIC).

Data storage 916 may be a Direct Access Storage Device (DASD). Although it is shown as a single unit, it could be a combination of fixed and/or removable storage devices, such as fixed disc drives, floppy disc drives, tape drives, removable memory cards, or optical storage. The memory 912 and data storage 916 could be part of one virtual address space spanning multiple primary and secondary storage devices.

The memory 912 may be a random access memory that is sufficiently large to hold the necessary programming and data structures of the present disclosure. While memory 912 is shown as a single entity, it should be understood that memory 912 may in fact comprise a plurality of modules, and that memory 912 may exist at multiple levels, from high speed registers and caches to lower speed but larger DRAM chips. The memory 912 may include an operating system 913. Any operating system supporting the functions disclosed herein may be used.

Memory 912 may also include a noise removal program 922 which, when executed by CPU 911, enables the identification and removal of noise from recorded seismic data as described herein. Generally speaking, the memory 912 may include one or more programs configured to remove noise (such as slow moving surface noise) from recorded seismic data, which may be stored in the memory 912 and/or data storage 916, and the programs may be further configured to display or otherwise provide the seismic data with the noise removed.

In methodologies directly or indirectly set forth herein, various steps and operations are described in one possible order of operation, but those skilled in the art will recognize that the steps and operations may be rearranged, replaced, or eliminated without necessarily departing from the spirit and scope of the disclosed embodiments. Further, all relative and directional references used herein are given by way of example to aid the reader's understanding of the particular embodiments described herein. They should not be read to be requirements or limitations, particularly as to the position, orientation, or use of the invention unless specifically set forth in the claims.

Furthermore, in various embodiments, the invention provides numerous advantages over the prior art. However, although embodiments of the invention may achieve advantages over other possible solutions and/or over the prior art, whether or not a particular advantage is achieved by a given embodiment is not limiting of the invention. Thus, the described aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computerized system. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a wireless network. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the computer into a machine-readable format and hence executable instructions. Also, programs are comprised of variables and data structures that either reside locally to the program or are found in memory or on storage devices.

What is claimed is:

1. A method of seismic data acquisition, comprising:
   positioning a plurality of seismic receivers in an array having a plurality of regions, each region in the array having a respective average spacing between seismic receivers, with the average spacing in a second region of the plurality of regions being greater than the average spacing in a first region of the plurality of regions that is adjacent to the second region;
   acquiring seismic data utilizing the plurality of seismic receivers;
   transforming the acquired seismic data into a surface phase velocity domain using a beam forming operation;
   identifying noise in the acquired seismic data based at least in part on surface phase velocities observed in the acquired seismic data once transformed into the surface phase velocity domain; and
   removing the noise identified in the acquired seismic data once transformed into the surface phase velocity domain.

2. The method of claim 1, wherein the average spacing in a third region of the plurality of regions is greater than the average spacing in the second region, with the third region being adjacent to the second region.

3. The method of claim 2, wherein the first, second, and third regions are defined by concentric rings, with the first region being an inner region, the second region being a middle region, and the third region being an outer region.

4. The method of claim 3, wherein each of the concentric rings define a circle, an ellipse, an octagon, a hexagon, a square, a rectangle, or a triangle.

5. The method of claim 3, wherein each of the concentric rings define a partial or non-symmetrical circle, ellipse, octagon, hexagon, square, semi-rectangle, or triangle.

6. The method of claim 3, wherein each of the plurality of seismic receivers is positioned on one of the concentric rings.

7. The method of claim 3, wherein each of the plurality of seismic receivers is positioned in spaces between the concentric rings.

8. The method of claim 3, wherein the average spacing between seismic receivers in the third region is substantially similar to a distance between a second of the concentric rings defining the second region and a third of the concentric rings defining the third region.

9. The method of claim 3, wherein a first distance between a second of the concentric rings defining the second region and a third of the concentric rings defining the third region is greater than a second distance between the second of the concentric rings and a first of the concentric rings defining the first region.

10. The method of claim 3, wherein distances between the concentric rings get progressively larger from an inner ring to an outer ring.

11. The method of claim 1, wherein the average spacing in the first region is at least three times less than the average spacing in the second region.

12. The method of claim 1, wherein the seismic receivers are randomly or pseudo-randomly spaced within each of the plurality of regions.

13. The method of claim 12, wherein a randomness factor associated with the randomly or pseudo-randomly spaced receivers is 0.5 or less.

14. The method of claim 1, wherein the average spacing between seismic receivers is smallest in a middle region of the plurality of regions, with the average spacing between seismic receivers getting progressively greater in regions progressively further away from the middle region.

15. The method of claim 1, wherein the plurality of seismic receivers are positioned in a manner to enable them to record surface phase velocity information associated with near-surface noise.

16. The method of claim 1, wherein the plurality of seismic receivers are positioned at varying depths at or near an earth surface.

17. The method of claim 16, wherein seismic receivers in the first region are positioned at the earth surface, and seismic receivers in the second region are positioned below the earth surface.

18. The method of claim 1, wherein the beam forming operation is one or more of a radon transform, a slant stack transform, or a radon inversion transform.

19. The method of claim 1, further comprising:
inverse transforming the acquired seismic data following removal of the noise.

20. The method of claim 1, further comprising:
prior to transforming the acquired seismic data, weighting traces recorded by respective seismic receivers based at least in part on an average spacing between the respective seismic receiver and two or more neighboring seismic receivers.

21. The method of claim 20, wherein each trace is weighted by a factor of the average spacing between the respective seismic receiver and the two or more neighboring seismic receivers raised to a power between 1 and 2.

22. The method of claim 1, further comprising:
prior to transforming the acquired seismic data, weighting traces corresponding to seismic receivers positioned in the first region less than traces corresponding to seismic receivers positioned in the second region.

23. The method of claim 1, further comprising:
applying a sparsity constraint during said transforming of the acquired seismic data.

24. The method of claim 23, wherein the sparsity constraint operates to encourage a sparse or spiky angular decomposition result in the beam forming operation.

25. The method of claim 24, wherein the sparsity constraint is applied by iteratively applying the beam forming operation, with each subsequent iteration of the beam forming operation penalizing a surface phase velocity component by the inverse of the amplitude of that surface phase velocity component from a previous iteration of the beam forming operation.

26. The method of claim 1, further comprising:
computing and applying time shift corrections for at least some of the plurality of seismic receivers before or during the beam forming operation such that the time shift corrections vary smoothly in the surface phase velocity domain.

27. The method of claim 26, further comprising:
computing the time shift corrections to enhance a sparse or spiky characteristics of the acquired seismic data in the surface phase velocity domain.

28. The method of claim 1, further comprising:
computing positioning errors for at least some of the plurality of seismic receivers before or during the beam forming operation.

29. The method of claim 28, further comprising:
computing the positioning errors to enhance a sparse or spiky characteristic of the acquired seismic data in the surface phase velocity domain.

30. The method of claim 1, wherein the array is a first array having a first plurality of seismic receivers, the method further comprising:
positioning a second plurality of seismic receivers in a second array that touches or overlaps the first array; and
acquiring seismic data utilizing the first plurality of seismic receivers and the second plurality of seismic receivers.

31. A seismic data acquisition system, comprising:
a plurality of seismic receivers arranged in an array having a plurality of regions, each region in the array having a respective average spacing between seismic receivers, with the average spacing in a second region of the plurality of regions being greater than the average spacing in a first region of the plurality of regions that is adjacent to the second region; a data storage coupled to the plurality of seismic receivers and configured to store seismic data acquired by the plurality of seismic receivers;
a data processor coupled to the plurality of seismic receivers and configured to:
transform the acquired seismic data into a surface phase velocity domain; and using a beam forming operation; and
removing the noise identified in the acquired seismic data once transformed into the surface phase velocity domain
identify noise in the acquired seismic data based at least in part on surface phase velocities observed in the acquired seismic data once transformed into the surface phase velocity domain.

* * * * *